Jan. 18, 1938.                F. J. LYDEN                 2,105,772
DYNAMO-ELECTRIC MACHINE
Filed Sept. 12, 1935
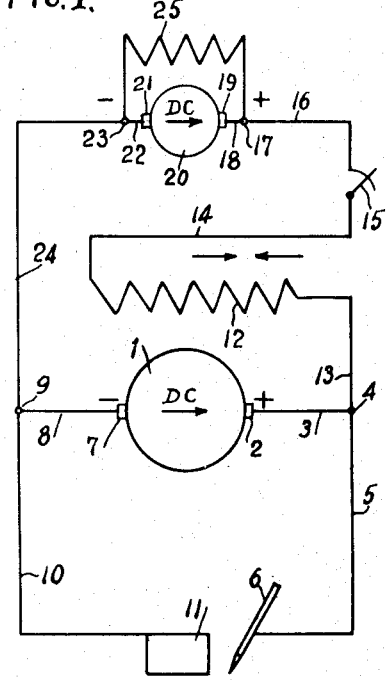
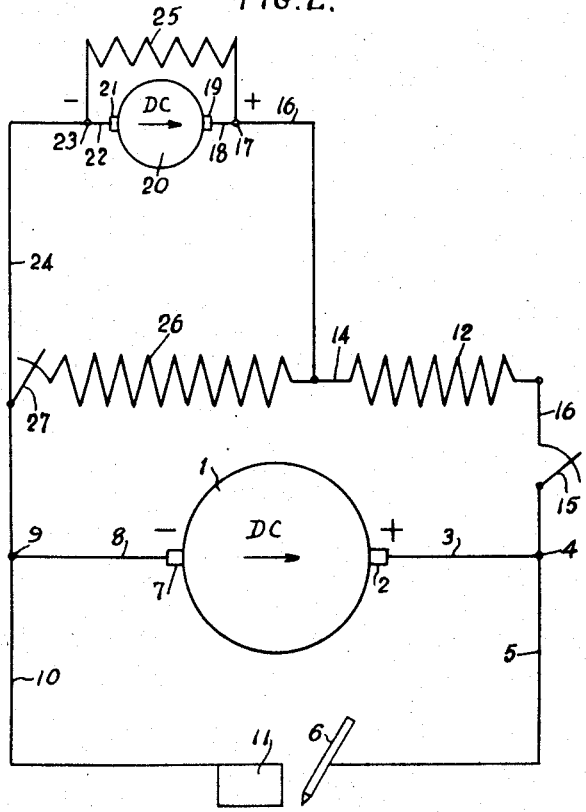
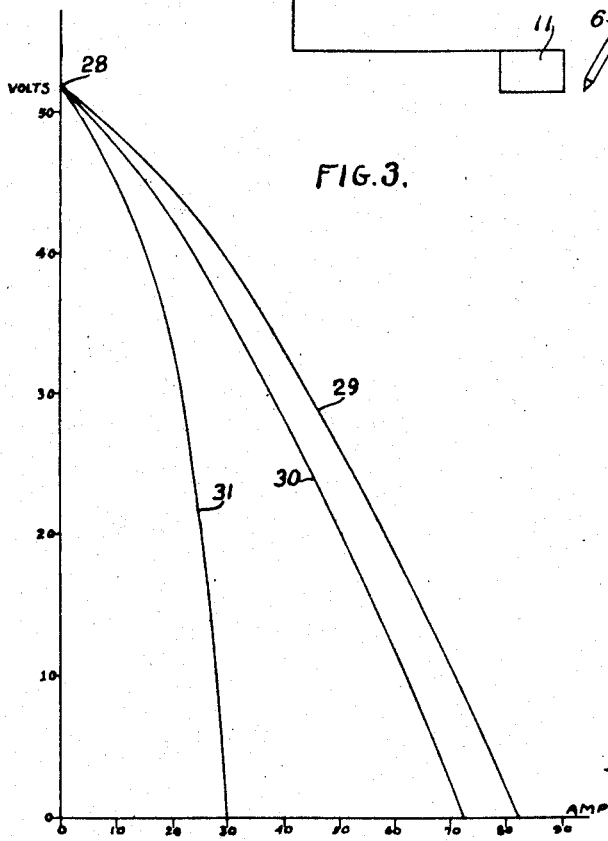
FRANK J. LYDEN, Patented Jan. 18, 1938

2,105,772

UNITED STATES PATENT OFFICE

2,105,772

DYNAMO-ELECTRIC MACHINE

Frank J. Lyden, Indianapolis, Ind., assignor to J. D. Adams Manufacturing Company, Indianapolis, Ind., a corporation of Indiana Application September 12, 1935, Serial No. 40,304

9 Claims. (Cl. 171—224)

My invention relates to dynamo electric machines. The principles of the invention are broadly applicable to dynamo electric machines. One of the typical uses to which the invention can be put is in connection with electric welding.

It is an object of the invention to provide a novel compound generator.

It is an object of the invention to provide a generator in which the no-load voltage is always the same, irrespective of the variation of the amperage curves.

It is an object of this invention to provide an arrangement by which a main welding generator and an exciter are so associated that by adjusting the generator relationship, an additive, balanced or subtractive condition of the working circuit may be obtained.

It is a further object to provide in such an arrangement for a constant open circuit voltage by varying the resistance to secure different amperages while maintaining the same drooping voltage characteristics as in the separately excited, differentially wound generator.

It is an object to control the amperage as a function of the current determined by the exciter. The current delivered by the exciter is a direct function of the line voltage.

It is an object to provide a method and means by which as the welding voltage is reduced in the welding circuit, the exciter is forced to supply more current.

It is a further object to provide a self-adjusting, separate current source adapted upon variation of voltage in the welding work circuit to adjust the voltage therein by the delivery of more current to the welding circuit either through or around the fields of the welding generator.

It is an object to provide a supplementary generator exciter faster and more responsive than the main generator and to utilize it in the control and balance of the voltage in the welding work circuit.

It is an object to provide a supplementary generator that is additive in its effect upon the voltage in the welding work circuit.

It is an object to provide a dynamo electric machine in which the supplementary generator has its armature connected in parallel with the armature of the main generator and with the main field winding in series.

It is a further object to provide such an arrangement in which a second field winding on the main generator is employed which is directly connected across the exciter.

Referring to the drawing, Figure 1 is a diagram of a main welding generator and the supplementary exciter generator with the armatures of the two generators connected in parallel with the main field winding in series.

Figure 2 is a similar arrangement with the modification of a second field winding on the main generator which is directly connected across the exciter.

Figure 3 is a graphic indication of the several curves which have the same open circuit voltage but variable amperage, depending upon the resistance adjustment in the circuit.

Referring to the drawing in detail, the generator 1 has an armature connected by the brush 2 to the line 3, which is connected at the junction point 4 to the welding circuit 5, to which is connected the welding rod 6.

The other side of the welding generator 1 is connected by its brush 7 to the line 8 through the junction point 9. The junction point 9 is connected to the other side of the welding circuit designated 10, which in turn is connected to the work piece 11. The main welding generator is provided with a field winding 12 connected on one side by the wire 13 to the junction point 4 and on the other side by the wire 14 to the adjustable resistance 15, the other side of which is connected by the wire 16 to the terminal 17. The terminal 17 is connected by the wire 18 and brush 19 to the direct current exciter generator or supplementary generator 20 that in turn is connected to the brush 21, wire 22 and terminal 23 by the wire 24 to the terminal 9. Thus the armatures of the main and supplementary generators are in parallel and the main field winding of the main generator is in series with the armature of the supplementary generator.

The supplementary generator is provided with a shunt field winding 25 connected on one side to the terminal 17 and on the other to the terminal 23.

Referring to Figure 2, it will be noted that the arrangement is the same as in Figure 1, with the exception that the additional field winding 26 is connected on one side to the wire 14 and the other side by the adjustable resistance 27 to the wire 24. The resistance 15 has been moved to a point between the field winding 12 and the terminal 4. The two field windings 12 and 26 may oppose or aid one another.

In Figure 3 there is shown a graph indicating typical curves of the performance of the machines embodying Figure 2 with field windings 12 and 26 in opposition. In such an arrangement as indicated in those figures, it will be observed that the voltage at the top point as at 28 is the same open circuit voltage for all adjustments, whereas by adjusting the resistance 15 only, different curves giving different amperages are secured as at 29, 30 and 31 and these curves have a drooping voltage characteristic that is desirable.

In these machines the form in Figure 1 may have the characteristics of a compound generator in which it is possible to control the compounding while the machine is in operation by adjusting the resistance 15.

In the form shown in Figure 2, the shunt winding of the main generator is wound in two sections 26 and 12. These two windings oppose or aid each other. With the armatures of the generator 1 and the exciter generator 20 connected in parallel through the field winding 12 and the resistance 15, and the generator 1 and exciter 20 so proportioned that at no load the voltage 23—17 (exciter voltage) equals the main generator voltage 5—10, there is no voltage on the shunt winding 12 nor on the resistance 15 because point 14 and point 4 have the same potential. Therefore, no current flows between 14—12—4 at no load no matter at what point the resistance 15 may be set. With an increasing load on the main welding circuit 5 and 10, the generator 1 and exciter 20 are loaded simultaneously because they are connected in parallel. The exciter furnishes its share of current to the welding circuit 5—10 in addition to load due to winding 26 and the path of the additional current furnished by the exciter is 17—14—4—5—6—11—10—9—24—23. This additional current will cause either a compounding or a differential effect of the main generator because its path is directed through the winding 12 dependent upon the relation of the winding 26 to winding 12 (aiding or opposing).

If the load on 5—10 is increased, the voltage on the shunt field winding 12 of the generator increases, reaching a maximum at 5—10 short circuited. In this case (short circuit) the exciter furnishes current to two windings connected in parallel, namely, 26 and 12, and while the main generator voltage is now zero, the excitation voltage is not zero and depends upon the exciter load characteristic, while it may or may not droop with increasing load.

I have, therefore, a generator in which a compounding or a differential effort can be secured, which method is based upon the parallel operation of two generators, one to be relatively large and one to be relatively small, with a load connected between the two generators, which load is to prevent the exciter voltage from being equal to the main generator voltage.

Thus I have a separately exciter generator in which the exciter is automatically forced to take an increasing load with increasing load on the main generator. This increasing exciter load is utilized to obtain certain characteristics.

By adjusting the generator relationships, I can get an additive, balanced or subtractive condition of the voltage in the working circuit. This is illustrated by the following tabulation. The particular condition in the second instance is that illustrated in Figure 3, wherein I have shown three curves 29, 30 and 31 respectively representing current values obtained with three separate adjustments of resistance 15, the field windings 12 and 26 being, as indicated in the second instance below, in opposition.

| | | | |
|---|---|---|---|
| (1) | No load | E 5–10=E 16–24 | 12 no current |
| | Increasing load | E 5–10<E 16–24 | 12 aiding 26 |
| (2) | No load | E 5–10=E 16–24 | 12 no current |
| | Increasing load | E 5–10<E 16–24 | 12 opposing 26 |
| (3) | No load | E 5–10>E 16–24 | 12 aiding 26 |
| | ↓ | E 5–10=E 16–24 | 12 no current |
| | Short circuit | E 5–10<E 16–24 | 12 opposing 26 |
| (4) | No load | E 5–10>E 16–24 | 12 opposing 26 |
| | ↓ | E 5–10=E 16–24 | 12 no current |
| | Short circuit | E 5–10<E 16–24 | 12 aiding 26 |
| (5) | No load | E 5–10<E 16–24 | 12 aiding 26 |
| | ↓ | E 5–10<E 16–24 | ↓ |
| | Short circuit | ↓ | |
| (6) | No load | E 5–10<E 16–24 | 12 opposing 26 |
| | ↓ | ↓ | ↓ |
| | Short circuit | | |

Welding generators have special characteristics. The high open circuit voltage requires a relatively strong field. This field must be reduced with increasing load in order to get the desired drooping characteristic.

Such characteristics can be obtained with this generator as illustrated in the tabulation in the second instance. Windings 12 and 26 are in that instance, opposing. If the exciter voltage 23—17 and main generator voltage 5—10 are equal at no load, then the winding 12 and also the adjustable resistance or rheostat 15 carries no current, no matter what position the rheostat is in. But a different volt ampere curve will be obtained with every change in the resistance 15, keeping the no load voltage the same, as shown in Figure 3, which shows three curves representing various adjustments of the resistance 15 when the voltage in the generator circuit is less than the voltage of the exciter circuit.

It is of great importance on welding machines to have the open circuit voltage constant for all current settings, and most welding generators nowadays do not accomplish this but have a lower open circuit voltage at lower welding currents.

It is also important to be able to control the generator by one rheostat and still keep the same open circuit voltage.

One of the ideas of this invention is to provide a self-adjusting separate current source, such as the generator 20, adapted upon variation in the welding work circuit voltage to adjust the voltage and to deliver more current through the field 12 or around the field to the welding circuit. This adjustment can be made rapidly, efficiently and fast.

I effect control of the volt ampere curve as a function of the power delivered by the exciter. The power delivered by the exciter is the direct function of the line voltage. If the load on the welding generator is increased, the exciter 20 is forced to supply more output.

In the operation of the mechanism shown in Figure 1, the characteristics of this arrangement depend on the difference in voltage between the main generator 1 and the exciter generator 2.

There are three possible cases. The voltage of the exciter 20 may be greater than the main generator voltage 1 (no load). In this case a current will flow through field winding 12 from 17 to 4. As the load increases on the main welding circuit 5—10, the voltage drops, and as the voltage of the supplementary generator 20 is constant, an increase in welding current will follow, which in turn raises the voltage in the main circuit until the field is saturated and then the voltage will begin to fall.

The second case is that when the voltage of the exciter 20 is equal to the main generator voltage at no-load, but this condition can not exist because if the voltage in this supplementary generator equals that of the main generator, then the field winding 12 would carry no current, which means that no voltage is generated in the main generator.

The third condition is that when the voltage of the exciter 20 is smaller than the main generator voltage at no load. The current in the field winding 12 flows in a direction opposite to the first case (no load supposed) with an increasing load on the main circuit 5—10, the voltage decreases and also the difference in voltage between the main generator 1 and the exciter 20, and the current in the field also decreases. The current in winding 12 and the field strength thereof decreases with increasing load and when the main circuit voltage equals the exciter voltage, no current flows in 12.

It will be understood that I desire to comprehend within my invention such modifications as may be necessary to adapt it to varying conditions and uses.

Having thus fully described my invention, what I claim as new and desire to secure by Letters Patent, is:

1. In combination, a main generator and main generator circuit, a supplementary exciter generator and supplementary circuit connected thereto, said generators being arranged in parallel; and a pair of opposed windings of the main generator so arranged that the windings are in series relationship to each other and one of the field windings in shunt relationship to one of said generators and the pair of series connected field windings in shunt relationship to the other of said generators.

2. In combination, a main generator and main generator circuit, a supplementary exciter generator and supplementary circuit connected thereto, said generators being arranged in parallel; a pair of opposed windings of the main generator so arranged that the windings are in series relationship to each other and one of the field windings in shunt relationship to one of said generators and the pair of series connected field windings in shunt relationship to the other of said generators, and means of adjusting by an adjustable resistance the relationship of said field windings.

3. In combination, a main generator and main generator circuit, a supplementary exciter generator and supplementary circuit connected thereto, said generators being arranged in parallel; a pair of opposed windings of the main generator so arranged that the windings are in series relationship to each other and one of the field windings in shunt relationship to one of said generators and the pair of series connected field windings in shunt relationship to the other of said generators, and means of adjusting by an adjustable resistance the relationship of said field windings independently one of the other so as to adjust the effect of one upon the other.

4. In combination, a main generator and main generator circuit, a supplementary exciter generator and supplementary circuit connected thereto, said generators being arranged in parallel; a pair of opposed windings of the main generator so arranged that the windings are in series relationship to each other and one of the field windings in shunt relationship to one of said generators and the pair of series connected field windings in shunt relationship to the other of said generators, means of adjusting by an adjustable resistance the relationship of said field windings independently one of the other so as to adjust the effect of one upon the other, and a shunt field for said supplementary generator.

5. In combination, a main generator, a main generator circuit, a field winding, means to adjust said winding, a supplementary exciter generator and circuit connected in series with said field winding and parallel to said main generator and main generator circuit; and a second field winding of the main generator directly connected across the exciter.

6. In combination, a main generator, a main generator circuit, a field winding, means to adjust said winding, a supplementary exciter generator and circuit connected in series with said field winding and parallel to said main generator and main generator circuit; a second field winding of the main generator directly connected across the exciter, and means of adjusting said second field winding.

7. In combination, a main generator and main generator circuit, a supplementary generator circuit connected around the main generator on opposite sides of the circuit, a plurality of field windings of the main generator arranged in the supplementary circuit, a supplementary generator supplying current thereto, and a shunt field winding for said supplementary generator, one of said main field windings being arranged in series and one in shunt relationship to the supplementary generator.

8. In combination, a main generator and main generator circuit, a supplementary generator circuit connected around the main generator on opposite sides of the circuit, a plurality of field windings of the main generator arranged in the supplementary circuit, a supplementary generator supplying current thereto, a shunt field winding for said supplementary generator, one of said main field windings being arranged in series and one in shunt relationship to the supplementary generator, and means of independently adjusting the relationship of said field windings.

9. In combination, a main generator and a main circuit including two field windings, and a supplementary exciter generator so connected to the main circuit that its armature is in parallel with the armature of said main generator and with one of said field windings, the other of said field windings being in series with the armature of the supplementary exciter generator.

FRANK J. LYDEN.